(12) United States Patent
Gashgaee et al.

(10) Patent No.: US 10,648,587 B2
(45) Date of Patent: May 12, 2020

(54) DIAPHRAGM VALVE WITH TOTAL VALVE CAVITY EVACUATION

(71) Applicant: ENTEGRIS, Inc., Billerica, MA (US)

(72) Inventors: Iraj Gashgaee, Marlborough, MA (US); George Gonnella, Pepperell, MA (US); Bruce Garber, South Attleboro, MA (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 16/079,709

(22) PCT Filed: Mar. 31, 2017

(86) PCT No.: PCT/US2017/025345
§ 371 (c)(1),
(2) Date: Aug. 24, 2018

(87) PCT Pub. No.: WO2017/173252
PCT Pub. Date: Oct. 5, 2017

(65) Prior Publication Data
US 2019/0056041 A1 Feb. 21, 2019

Related U.S. Application Data

(60) Provisional application No. 62/317,299, filed on Apr. 1, 2016.

(51) Int. Cl.
*F16K 31/126* (2006.01)
*F16K 31/122* (2006.01)
(Continued)

(52) U.S. Cl.
CPC .............. *F16K 31/126* (2013.01); *F16K 7/17* (2013.01); *F16K 31/122* (2013.01); *F16K 47/00* (2013.01)

(58) Field of Classification Search
CPC ........ F16K 31/126; F16K 7/17; F16K 31/122; F16K 31/1226; F16K 31/1223; F16K 47/00; F16K 7/12
(Continued)

(56) References Cited

U.S. PATENT DOCUMENTS 3,451,423 A * 6/1969 Priese ..................... F16K 7/126
137/556
3,740,019 A * 6/1973 Kessell ............... F16K 31/0658
251/129.17

(Continued)

FOREIGN PATENT DOCUMENTS

CN 2733122 Y 10/2005
CN 101344178 A 1/2009
(Continued)

*Primary Examiner* — John Bastianelli
(74) *Attorney, Agent, or Firm* — Entegris, Inc.

(57) ABSTRACT

A fluid valve incorporates a plunger with a fluid channel. The plunger is connected to a boss coupled to a diaphragm, this boss also includes a fluid channel and the plunger and boss fluid channels are in fluid communication. The boss fluid channel opens to the backside of the diaphragm in the valve cavity and permits substantially complete pressurization or evacuation of the volume behind the diaphragm in the valve. The substantially complete pressurization of the volume behind the diaphragm enables full closure of the diaphragm and improves contact of the diaphragm with the valve seat thereby improving performance of the valve.

13 Claims, 8 Drawing Sheets

(51) Int. Cl.
  *F16K 7/17*    (2006.01)
  *F16K 47/00*   (2006.01)
(58) Field of Classification Search
  USPC .................. 251/331, 335.2, 63.5, 48–55
  See application file for complete search history.

(56) References Cited

U.S. PATENT DOCUMENTS

| | | | | |
|---|---|---|---|---|
| 4,836,236 | A * | 6/1989 | Ladisch | F16K 27/07 |
| | | | | 137/241 |
| 5,002,086 | A * | 3/1991 | Linder | F16K 17/0453 |
| | | | | 137/312 |
| 6,907,897 | B2 * | 6/2005 | Maula | F16K 7/14 |
| | | | | 137/334 |
| 6,948,697 | B2 * | 9/2005 | Herbert | F16K 31/0672 |
| | | | | 251/129.04 |
| 7,063,304 | B2 * | 6/2006 | Leys | F16K 7/17 |
| | | | | 251/331 |
| 7,066,202 | B2 * | 6/2006 | Fukano | F16K 7/14 |
| | | | | 137/553 |
| 7,628,376 | B2 * | 12/2009 | Masamura | F16K 7/14 |
| | | | | 251/331 |
| 2004/0036045 | A1 * | 2/2004 | Weingarten | F16K 7/14 |
| | | | | 251/61.5 |
| 2005/0092079 | A1 * | 5/2005 | Ales | F16K 7/14 |
| | | | | 73/270 |
| 2009/0166574 | A1 | 7/2009 | Hagihara | |
| 2012/0055555 | A1 | 3/2012 | Saint-Paul et al. | |

FOREIGN PATENT DOCUMENTS

| | | |
|---|---|---|
| CN | 103363149 A | 10/2013 |
| WO | 2011109502 A1 | 9/2011 |

\* cited by examiner

DIAPHRAGM VALVE WITH TOTAL VALVE CAVITY EVACUATION

RELATED APPLICATIONS

The benefit of priority under 35 U.S.C. § 119 of U.S. Provisional Patent Application No. 62/317,299, filed 1 Apr. 2016, is hereby claimed. The disclosure of U.S. Provisional Patent Application No. 62/317,299 is incorporated herein by reference in its entirety for all purposes.

TECHNICAL FIELD

This disclosure relates generally to fluid systems. More particularly, this disclosure relates to valves of fluid systems. Even more specifically, this disclosure relates to diaphragm valves and high precision diaphragm valves with full closure.

SUMMARY

There are many applications for which precise control over the amount or rate at which a fluid is dispensed or moved by a fluid system is necessary. In semiconductor processing, for example, it is important to control the amount and rate at which photochemicals, such as photoresist chemicals, are applied to a semiconductor wafer. The coatings applied to semiconductor wafers during processing typically require a flatness across the surface of the wafer that is measured in angstroms. The rates at which processing chemicals are applied to the wafer have to be controlled in order to ensure that the processing liquid is applied uniformly. Moreover, many photochemicals used in the semiconductor industry today are very expensive, frequently costing as much as $1000 a liter. Therefore, it is preferable to ensure that a minimum but adequate amount of chemical is used and that the chemical is not damaged by the pumping apparatus.

To achieve these goals, some designs for fluid systems for such chemicals rely on diaphragm valves to move or exert pressure on the process fluid. Hydraulic or pneumatic pressure is typically used to control pressure on one side of the diaphragm to cause the diaphragm of the valve to move, thereby opening or closing the valve and moving fluid through the system.

In particular, these diaphragm valves may utilize a diaphragm that is captured or otherwise retained around an outer edge in a valve cavity. Hydraulic or pneumatic pressure can then be applied to the back side of the diaphragm to open or close the diaphragm valve. Typically, however, the actuating pressure is applied to the back side of the diaphragm unevenly. In particular, the actuating pressure may be directly applied to the diaphragm only at a center portion of the diaphragm. Accordingly, the diaphragm is moved or held in a closed position by applying sufficient actuating pressure to this center portion of the diaphragm, forcing fluid from the valve cavity and closing off the fluid flow path.

These types of diaphragm valves have a number of problems. One of the main issues is that it may be difficult to obtain full closure of these types of diaphragm valves. More specifically, in a closed position the diaphragm of the valve should fully seat against a valve seat of the valve cavity. Achieving this full seating is difficult, however, because in such valve designs the actuating pressure is directly applied only to the center of the diaphragm, while the diaphragm is retained around the outer periphery. As a result, the diaphragm may not fully seat against the valve seat and may bulge away from the valve seat in one or more areas between the center portion of the diaphragm (where the actuating pressure is being directly applied) and the retained outer periphery of the diaphragm. These bulges may trap air or process fluid, causing the formation of air bubbles or gels. The air bubbles or gels may cause a number of problems to occur, including increasing the priming time of a pump incorporating such valves, promoting particle generation, mis-dispense of fluid from fluid systems incorporating such valves, difficulty in cleaning fluid systems incorporating these valves, poor fluid handling characteristics of fluid systems, or other deleterious effects. The problems endemic to these types of valves may be further exacerbated by the high-viscosity fluids used in some semiconductor processes.

SUMMARY

What is desired are diaphragm valves that obtain full closure by allowing the diaphragm of the valve to fully seat. It will be understood with respect to this disclosure that the use of the terms full closure and full seating are meant to indicate closure or seating that achieves greater evacuation of air or fluid from between a diaphragm and a valve seat than previous designs of diaphragm valves lacking the advantageous features of embodiments of the present disclosure.

To those ends, among others, diaphragm valves as disclosed may achieve full closure by allowing actuating pressure to be more evenly or fully applied to the back side of one or more portions of the diaphragm. Specifically, certain embodiments of diaphragm valves as disclosed may have a fluid passage formed in a portion of the diaphragm assembly, allowing fluid communication between the back side of the diaphragm and a pressure source (e.g., a source of the pressurized actuating fluid). Even more particularly, in certain embodiments, the fluid flow passage formed in the diaphragm assembly allows the actuating fluid to flow to the portion of the valve cavity behind the diaphragm between the center portion of the diaphragm and a retained outer edge of the diaphragm. The actuating fluid can therefore exert pressure directly on the back side of the diaphragm, forcing the diaphragm to fully seat against the valve seat and thus fully close the valve.

Moreover, in embodiments of a diaphragm valve that utilize an actuator (e.g., a plunger or the like) acting on the diaphragm to open or close the diaphragm, a fluid passage may also be formed in the actuator to allow fluid communication between the pressure source and the back side of the diaphragm. In these embodiments, pressurized actuating fluid can flow from the pressure source through the fluid passage formed in the actuator, through the fluid passage formed in the diaphragm assembly to the portion of the valve cavity behind the diaphragm between the center portion of the diaphragm and the retained outer edge of the diaphragm, forcing the diaphragm to fully seat against the valve chamber and fully close the valve.

One embodiment of a valve comprises a plunger in a valve assembly cavity, the plunger includes a plunger cavity formed in a plunger stem, and a plunger fluid flow passage is formed in the plunger. The plunger fluid flow passage fluidly connects an actuation fluid cavity in a valve plate and the plunger cavity. The valve further includes a diaphragm assembly in the valve assembly cavity, the diaphragm assembly comprises a diaphragm and a boss. The diaphragm assembly is secured in the valve between a diaphragm spacer and a fluid block in the valve assembly cavity and the diaphragm assembly fluidly separates the valve cavity in the valve assembly into a process fluid side and an actuation fluid side. In the valve, the boss is coupled to the plunger stem through a passage of the diaphragm spacer. The boss comprises a boss fluid flow passage formed through it that fluidly interconnects the activation fluid cavity, the plunger cavity, and the actuation fluid side of said valve cavity.

In some embodiments of the valve, the plunger fluid flow passage and boss fluid flow passage have a length and cross section such that the plunger is translated toward or away from the fluid actuation cavity in the valve plate by a change in pressure in the fluid activation cavity before substantial pressure is applied to or reduced in the volume of the fluid actuation side of the valve cavity between the back of the diaphragm and the diaphragm spacer.

In some embodiments of the valve, the plunger fluid flow passage open to the plunger cavity and an opening of the boss fluid flow passage that opens to a back side of diaphragm and the activation fluid side of valve cavity, allows fluid communication between plunger cavity and valve cavity when opening of boss fluid flow passage clears central passage of diaphragm spacer.

Accordingly, embodiments as disclosed provide a number of advantages. For example, embodiments may achieve full closure of a valve and may evacuate a great deal more fluid (e.g., either process fluid or air) from the valve when closed. In some embodiments, around 40% more fluid or air may be evacuated from a closed embodiment of such a valve than a comparable valve without such fluid passages formed in the diaphragm. The full closure of embodiments of valves of this type may reduce priming time for pumping or dispense systems employing these valves and decrease the formation of gels from residual process fluid. Consequently, the use of embodiments of such valves may result in more desirable fluid flow or dispense characteristics generally, reduced particle generation, and allow easier cleaning of such valves or fluid systems employing such valves.

These and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale. To the extent dimensions are provided, they are provided by way of example for particular embodiments or implementations and are not provided by way of limitation.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Certain diaphragm valves may utilize a diaphragm that is captured or otherwise retained around an outer edge in a valve cavity, with hydraulic or pneumatic pressure (an actuation fluid) being applied through an actuating plunger to a back side of the diaphragm to open or close the diaphragm valve. It is the case, however, that in certain of these valves the actuating pressure may be applied to the back side of the diaphragm unevenly or incompletely, preventing full closure of the valve and resulting in process fluid trapped between the diaphragm and valve seat.

Figure 1:
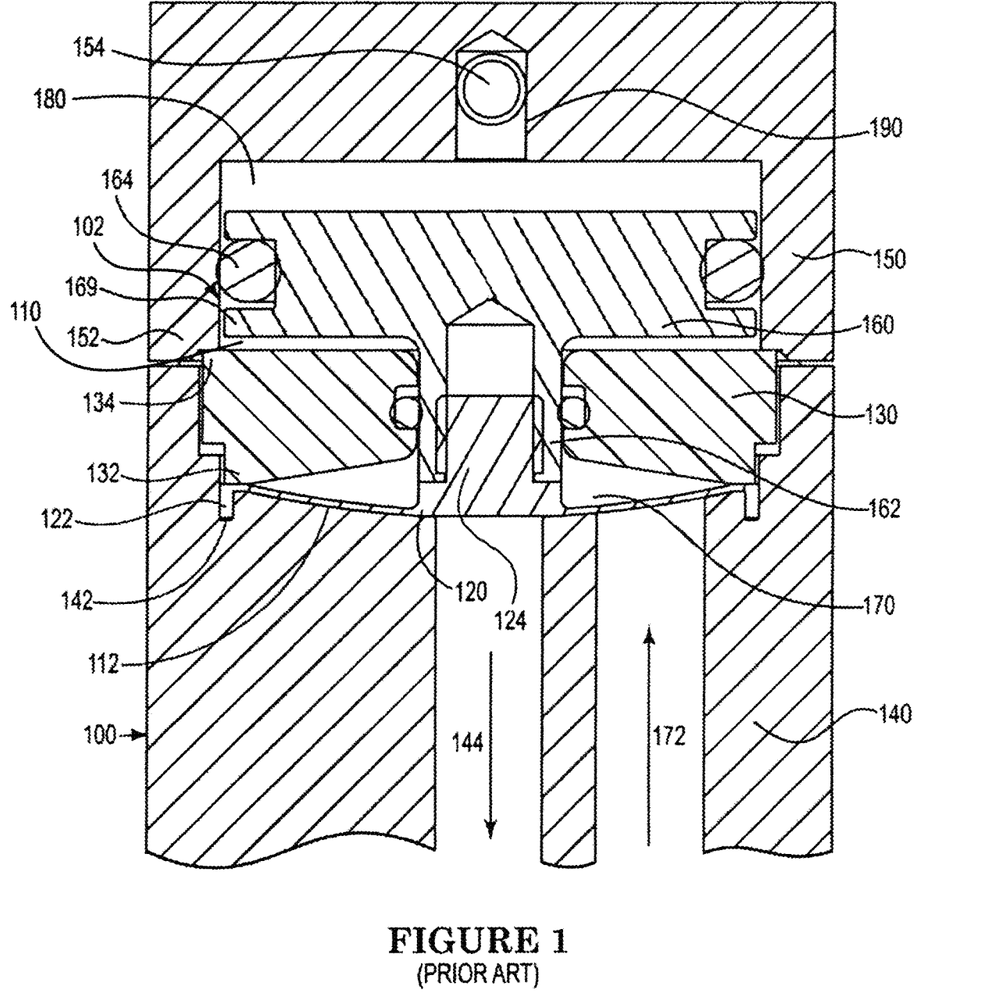
FIG. 1 is a diagrammatic representation of a cross-sectional view of a diaphragm valve.

FIG. 1 is a diagrammatic representation of a cross-section of just such a prior art valve. Here, valve 100 includes valve assembly 102 disposed in assembly cavity 110 formed between valve plate 150 and fluid block 140. Fluid block 140 includes inlet fluid flow passage 142 and outlet fluid flow passage 144 open to assembly cavity 110 through valve seat face 112 of fluid block 140. Inlet fluid flow passage 142 may be coupled to a source of fluid (e.g., process fluid or the like) such as by a pump, container or the like (not shown). Valve assembly 102 is disposed in assembly cavity 110 and includes a diaphragm 120, diaphragm spacer 130 and plunger 160. Diaphragm spacer 130 is disposed between the diaphragm 120 in assembly cavity 110 proximate to the fluid block 140, and plunger 160 disposed in assembly cavity 110 distal from the fluid block 140 and proximate the valve plate 150.

Valve cavity 170 is formed from the portion of the assembly cavity 110 between the diaphragm spacer 130 and valve seat 112 of fluid block 140. In particular, circumferential channel 142 may be formed in fluid block 140 at the circumference of valve seat face 112. This circumferential channel 142 is configured to capture lip 122 of diaphragm 120 and retain the diaphragm 120 in cooperation with shoulder 132 of diaphragm spacer 130 when sufficient coupling force is applied to the valve plate 150. The diaphragm 120 separates the valve cavity into a process fluid side and a non-process fluid side. Specifically, valve assembly 102 may be disposed in assembly cavity 110 and valve plate 150 coupled to the fluid block 140 using fasteners such as screws or the like (not shown). The coupling force (e.g., torque on the screws) may cause shoulder 152 of valve plate 150 to exert force on corresponding shoulder 134 of diaphragm spacer 130. Shoulder 132 of diaphragm spacer in turn, exerts force on lip 122 of diaphragm 120 captured in channel 142 of fluid block 140 to retain diaphragm 120 in channel 142.

Diaphragm 120 includes boss 124 coupled to plunger 160. In particular, diaphragm spacer 130 may be annular and plunger 160 is coupled to the diaphragm 120 through central passage of annular diaphragm spacer 130. Specifically, stem 162 of plunger 160 may extend through the central passage of diaphragm spacer 130 and be coupled to boss 124 of diaphragm 120. This coupling may be accomplished via cooperating threads on boss 124 and plunger stem 162. As another example, plunger stem 162 may be annular and include a lip disposed at the end of the plunger stem 162 distal from the plunger body. This lip may cooperate with a shoulder formed at the base of boss 124 of the diaphragm 120 by a circumferential channel at the base of diaphragm boss 124 where boss 124 joins diaphragm 120. An O-ring (not shown) may be disposed in an annular channel in diaphragm spacer 130 and seal against the outer wall of stem 162 disposed in the central passage of diaphragm spacer 130.

Pneumatic cavity 180 is formed from the portion of assembly cavity 110 between the back side of plunger 160 (e.g., the face of plunger distal from the fluid block 140) and valve plate 150. Pneumatic cavity 180 is in fluid communication with a pressure source through fluid flow passage 154 formed in valve plate 150. Fitting 190 may serve to couple the pressure source to the fluid flow passage 154. An O-ring 164 may be disposed in an annular channel 169 in plunger 160 and seal against the inner walls of assembly cavity 110 in valve plate 150 to seal pneumatic cavity 180 from other portions of the assembly cavity 110. It should be noted here that while certain descriptions, example and embodiments presented herein are described with respect to pneumatics and pneumatic pressure such descriptions, examples and embodiments could equally well be applied to, or utilized with, hydraulics or hydraulic pressure, in general the application or removal (reduced pressure) of an actuation fluid, as those of ordinary skill will understand.

In operation, to open the valve 100 the fluid flow passage 154 is exposed to force (e.g., by an application of vacuum or reduced pressure through fitting 190 from a pressure source). As a result of the application of vacuum or reduced pressure, force is applied to the back side of plunger 160 in pneumatic cavity 180, drawing plunger 160 in a direction away from fluid block 140 (and toward valve plate 150). As plunger 160 is drawn away from fluid block 140, plunger stem 162 draws diaphragm boss 124 through the central opening of diaphragm spacer 130 in turn drawing diaphragm 120 in a direction away from valve seat 112 of fluid block 140 and opening the valve 100.

Fluid (e.g., a process fluid or the like) may then be introduced into valve cavity 170 from inlet fluid flow path 172. The drawing of the diaphragm 120 away from the valve seat 112 may serve to draw fluid into valve cavity 170 through the inlet fluid flow path 172, the fluid may be placed under pressure (e.g., by a pump or the like coupled to the inlet fluid flow path 172) to force fluid through inlet fluid flow path 172 into the valve cavity 170, or some combination of the two may serve to introduce fluid into the valve cavity 170.

When it is desired to close valve 100 and force fluid through the outlet fluid flow path 144, positive pressure may be applied to the plunger 160 from a pressure source through the fluid path 154 (e.g., by an application of pressurized actuating fluid such as air or gas through fitting 190 from the pressure source). In one embodiment, this pressure may be around 60 pounds per square inch (PSI). The application of the positive pressure to the plunger 160 in pneumatic cavity 180 drives the plunger 160 towards the fluid block 140. As plunger 160 is driven toward fluid block 140, plunger stem 162 drives diaphragm boss 124 through the central opening of diaphragm spacer 130 in turn forcing diaphragm 120 against valve seat 112 of fluid block 140 forcing the fluid in valve cavity 170 through the outlet fluid flow path 144 and closing the valve 100. Pressure can be maintained in pneumatic cavity 180 by continuing to apply positive pressure to the actuating fluid from the pressure source through the fluid path 154, maintaining valve 100 in a closed position by forcing diaphragm 120 against valve seat 112.

As discussed above, however, the positive pressure to close the valve 100 is applied directly (e.g., via the plunger 160 driven by the pressurized actuating fluid) only to boss 124 at the center of diaphragm 120. As a result, when the diaphragm 120 is moving from an open to a closed position, or is in a closed position, there is an annular space in valve cavity 170 behind the diaphragm 120 between the boss 124 and the lip 122 of diaphragm 120 retained in channel 142 where no pressure is directly applied to the diaphragm 120 to force the diaphragm 120 against valve seat 112. As a result, in a closed position the diaphragm 120 may not fully seat against the valve seat 112 and may bulge away from the valve seat 112 in one or more areas of the annular portion of the diaphragm 120 between the boss 124 of the diaphragm (where the actuating pressure is being directly applied) and the retained lip 122 of the diaphragm. These bulges may trap air or process fluid, causing the formation of air bubbles, gels or particles. The air bubbles, gels or particles may cause a number of problems to occur, including increasing the priming time of a pump incorporating such valves, misdispense of fluid from a fluid system incorporating the valve, difficulty in cleaning fluid systems incorporating these valves, poor fluid handling characteristics, or other deleterious effects.

Accordingly, it is desirable to obtain full closure of these types of valves by better seating the diaphragm against the valve seat of the valve cavity. To those ends, among others, diaphragm valves as disclosed may apply actuating pressure more evenly or fully to the back side of the diaphragm of a valve. Specifically, certain embodiments of diaphragm valves as disclosed may have a fluid passage formed in a boss of a diaphragm assembly to allow fluid communication between a pressure source and a portion of the valve cavity behind a diaphragm. Even more particularly, in certain embodiments, the fluid flow passage formed in the boss allows the actuating fluid from the pressure source to flow to the portion of the valve cavity behind the diaphragm between a center portion (e.g., where the boss joins the diaphragm assembly) of the diaphragm and a retained outer edge of the diaphragm. The pressurized actuating fluid can therefore exert pressure directly on the back side of the diaphragm, forcing the diaphragm to fully seat against the valve seat and thus fully close the valve.

Moreover, in embodiments of a valve that utilize an actuator to exert force on a diaphragm, such as a plunger or the like, a fluid passage may also be formed in the actuator to allow fluid communication between the pressure source and the back side of the diaphragm. In these embodiments, pressurized actuating fluid can flow from the pressure source through the fluid passage formed in the actuator and through the fluid passage formed in the diaphragm to the portion of the valve cavity behind the diaphragm between the center portion of the diaphragm and the retained outer edge of the diaphragm, forcing the diaphragm to fully seat against the valve chamber or valve seat and fully close the valve.

It should be noted that in embodiments of such a valve, the same features that aid in closing of the valve through more full and even application of positively pressurized actuating fluid to the diaphragm may also allow more full and even application of actuating force applied (e.g., through the application of vacuum or reduced pressure) to open the valve by drawing the diaphragm in a direction away from the valve seat and open the valve.

Figure 2:
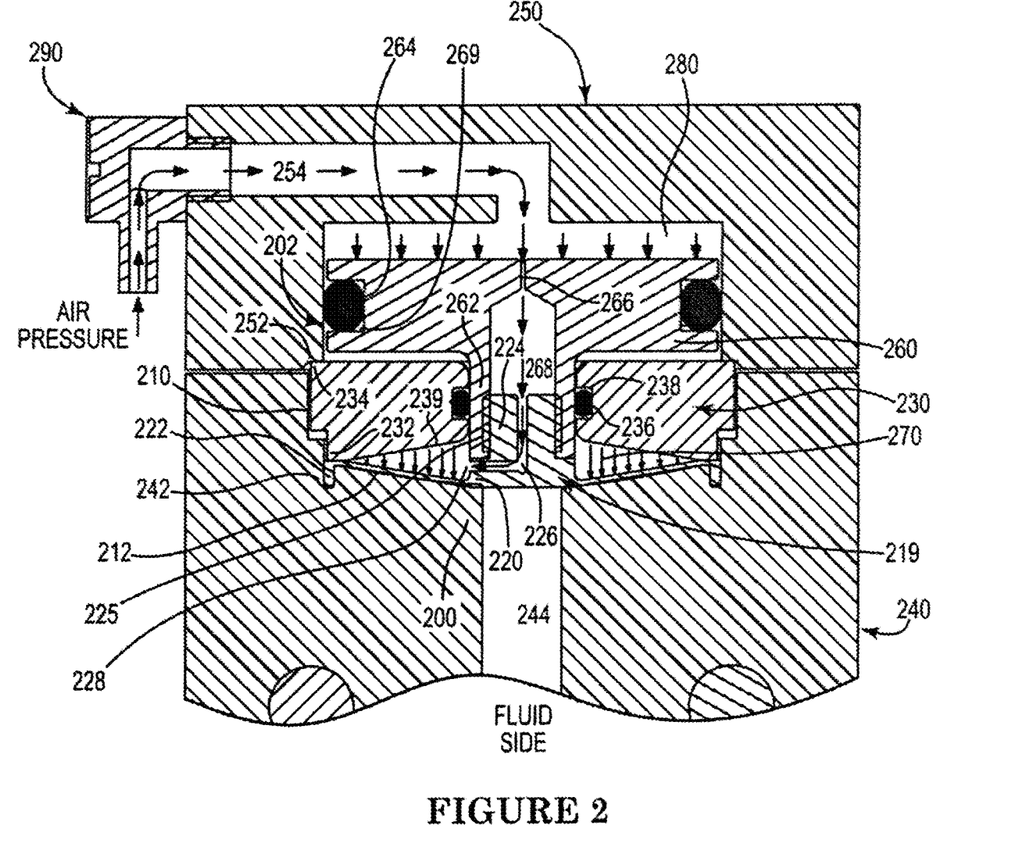
FIG. 2 is a diagrammatic representation of a cross-sectional view of one embodiment of a diaphragm valve.

Turning then to FIG. 2, a cross-section of one embodiment of a fully closing diaphragm valve is depicted. In this embodiment, valve 200 includes valve assembly 202 disposed in assembly cavity 210 formed between valve plate 250 and fluid block 240. Fluid block 240 and valve plate 250 can be a unitary block of polytetrafluoroethylene (PTFE), modified PTFE, machined aluminum or other material. Because these materials do not react with or are minimally reactive with many process fluids, the use of these materials may allow flow passages and cavities to be machined directly into fluid block 240 with a minimum of additional hardware. Specifically, fluid block 240 may include inlet fluid flow passage (not shown) and outlet fluid flow passage 244 open to assembly cavity 210 through valve seat 212 of fluid block 240. The inlet fluid flow passage may be coupled to a source of fluid such as a pump, container or the like.

Valve assembly 202 is disposed in assembly cavity 210 and includes a diaphragm assembly 219 having diaphragm 220 coupled to boss 224, diaphragm spacer 230 and plunger 260. Diaphragm assembly 219 may be a formed of a single piece of material or may be formed from a two (or more) pieces that are joined by, for example an adhesive or other fastener. The diaphragm assembly 219, or portions thereof, can be made by machining, molding or another process.

Diaphragm spacer 230 is disposed between diaphragm 220 in assembly cavity 210 proximate to the fluid block 240 and plunger 260 disposed in assembly cavity 210 distal from the fluid block 240 and proximate the valve plate 250. Valve cavity 270 is formed from the portion of the assembly cavity 210 between the diaphragm spacer 230 and valve seat face 212 of fluid block 240. In particular, circumferential channel 242 may be formed in fluid block 240 at the circumference of valve seat face 212. This circumferential channel 242 is configured to capture lip 222 of diaphragm 220 and retain the diaphragm assembly 219 in cooperation with shoulder 232 of diaphragm spacer 230 when sufficient coupling force is applied to the valve plate 250. Specifically, valve assembly 202 may be disposed in assembly cavity 210 and valve plate 250 coupled to the fluid block 240 using fasteners such as screws or the like (not shown). The coupling force (e.g., torque on the screws) may cause shoulder 252 of valve plate 250 to exert force on corresponding shoulder 234 of diaphragm spacer 230. Shoulder 232 of diaphragm spacer in turn, exerts force on lip 222 of diaphragm 220 captured in channel 242 of fluid block 240 to retain lip 222 of diaphragm 220 in channel 242.

Boss 224 of diaphragm assembly 219 is coupled to plunger 260. In particular, diaphragm spacer 230 may be annular and plunger 260 coupled to the diaphragm assembly 219 through the central passage of annular diaphragm spacer 230. Specifically, stem 262 of plunger 260 may extend through the central passage of diaphragm spacer 230 and be coupled to boss 224 of diaphragm assembly 219. This coupling may be accomplished via threaded joint 225 formed from cooperating threads on boss 224 and plunger stem 262 (e.g., threads on exterior surface of boss 224 and an interior wall of an annular plunger stem 262). As another example, plunger stem 262 may be annular (e.g., a hollow cylinder) and include a lip disposed at the end of the plunger stem 262 distal from the plunger body. This lip may cooperate with a shoulder formed at the base of boss 224 of the diaphragm assembly 219 by a circumferential channel at the base of diaphragm boss 224 where boss 224 joins diaphragm 220. An O-ring 236 may be disposed in annular channel 238 in diaphragm spacer 230 and seal against the outer wall of stem 262 disposed in the central passage of diaphragm spacer 230.

Pneumatic cavity 280 is formed from the portion of assembly cavity 210 between the back side of plunger 260 (e.g., the face of plunger distal from the fluid block 240) and valve plate 250. Pneumatic cavity 280 is in fluid communication with a pressure source through fluid flow passage 254 formed in valve plate 250. Fitting 290 may serve to couple the pressure source to the fluid flow passage 254. An O-ring 264 may be disposed in an annular channel 269 in plunger 260 and seal against the inner walls of assembly cavity 210 in valve plate 250 to seal plunger 260 against walls of valve plate 250.

Fluid flow passage 266 can be sized so that plunger 260 is translated toward or away from valve plate 250 in the pneumatic cavity before substantial pressure is applied to or reduced in the volume between the back of the diaphragm 220 and diaphragm spacer 230.

Additionally, plunger 260 includes fluid flow passage 266 allowing fluid communication between plunger cavity 268 formed in the plunger stem 262 and pneumatic cavity 280. Boss 224 of diaphragm assembly 219 also includes fluid flow passage 226 formed therethrough, having one opening to plunger cavity 268 and one opening 228 on the back side of diaphragm 220 to allow fluid communication between plunger cavity 268 and valve cavity 270 (e.g., when opening 228 of fluid flow passage 226 in boss 224 clears central passage of diaphragm spacer 230). Fluid flow passage 226 may, in one embodiment, have two portions, a first portion formed along an axis aligned with the direction of travel of plunger 260 and boss 224 and a second portion formed along an axis perpendicular to this axis of travel. It will be noted however, that fluid flow passage 226 (and fluid flow passage 266) may take almost any form or shape desired to achieve fluid communication between a source of (actuating) fluid pressure through fluid flow passage 254 and valve cavity 270 behind diaphragm 220. For example, fluid flow passage 226 may have multiple openings to plunger cavity 268 or valve cavity 270, or may be comprised of multiple distinct flow passages. Other embodiments are possible and are fully contemplated herein.

In operation, to open the valve 200 the fluid flow passage 254 is exposed to vacuum or reduced pressure (e.g., by an application of vacuum or lower pressure through fitting 290 from a pressure source). As a result of the application of vacuum or reduced pressure, force is applied to the back side of plunger 260 in pneumatic cavity 280, drawing plunger 260 in a direction away from fluid block 240. As plunger 260 travels away from fluid block 240, plunger stem 262 draws diaphragm boss 224 through the central opening of diaphragm spacer 230 in turn drawing diaphragm 220 in a direction away from valve seat 212 of fluid block 240 and opening the valve 200. Additionally, the force applied by an application of vacuum or reduced pressure through fluid flow passage 254 may be applied directly to the back side of diaphragm 220 in the region of valve cavity 270 behind the diaphragm 220 to open the valve 200, as fluid flow passage 266 and plunger cavity 268 in plunger 260 and fluid flow passage 226 through boss 224 of diaphragm assembly 219 cooperate to allow fluid communication between fluid flow passage 254 and the annular space of valve cavity 270 behind diaphragm 220. In one embodiment, the size of the components of the valve 200 may be configured such that when back side of plunger 260 reaches the wall of assembly cavity 210 in valve plate 250 distal from the fluid block 240 the back side of diaphragm 220 may contact face 239 of diaphragm spacer 230, thereby reducing or eliminating the actuation fluid volume portion of the valve cavity 270 forming valve cavity 270 while maximizing the process fluid volume portion of the valve cavity 270. The actuation fluid volume portion of the valve cavity 270 and process fluid volume portion of the valve cavity 270 are separated by the diaphragm 220.

Fluid (e.g., a process fluid or the like) may then be introduced into valve cavity 270 from an inlet fluid flow path (not shown). The traveling of the diaphragm 220 away from the valve seat 212 may serve to draw fluid into valve cavity 270 through the inlet fluid flow path, the fluid may be placed under pressure (e.g., by a pump or the like coupled to the inlet fluid flow path) to force fluid through the inlet fluid flow path into the valve cavity 270, or some combination of the two may serve to introduce fluid into the valve cavity 270.

The valve assembly 219 fluidly separates the valve cavity 270 in the valve assembly 210 into a process fluid side and an actuation fluid side (volume between the backside of diaphragm 220 and diaphragm spacer 230 surface 239. When it is desired to close valve 200 and force fluid through the outlet fluid flow path 244, positive pressure may be applied to the plunger 260 from a pressure source through the fluid path 254 (e.g., by an application of pressurized actuating fluid such as air or gas through fitting 290 from the pressure source). In one embodiment, this pressure may be around 60 pounds per square inch (PSI). The application of the positive pressure to the plunger 260 in pneumatic cavity 280 drives the plunger 260 towards the fluid block 240. As plunger 260 travels toward fluid block 240, plunger stem 262 drives diaphragm boss 224 through the central opening of diaphragm spacer 230 in turn forcing diaphragm 220 against valve seat 212 of fluid block 240, forcing the fluid in valve cavity 270 through the outlet fluid flow path 244 and closing the valve 200 by sealing the inlet fluid flow path and the outlet fluid flow path 244.

Additionally, as plunger 260 moves toward fluid block 240 opening 228 of fluid flow passage 226 in boss 224 clears the central passage of diaphragm spacer 230 bringing the region of valve cavity 270 behind diaphragm 220, or the actuation fluid side, into fluid communication with the pressure source through fluid flow passage 226 in boss 224, plunger cavity 268, fluid flow passage 266 in plunger 260 and fluid flow passage 254. Accordingly, the pressurized actuating fluid from the pressure source is applied directly to the back side of the diaphragm 220 in the region of valve cavity 270 between boss 224 and the retained lip 222 of the diaphragm 220. In other words, the pressurized actuating fluid from the pressure source is occupies the actuation fluid side volume between the backside of diaphragm 220 and the diaphragm spacer 230 surface 239. The directly applied pressure may aid in closing the valve 200 and serves to achieve full closure of the valve 200 by forcing diaphragm 220 to fully seat against valve seat 212, substantially eliminating air or process fluid trapped between diaphragm 220 and valve seat 212. Pressure can be maintained against the plunger 260 and directly against the back side of the diaphragm 220 in valve cavity 270 by continuing to apply positive pressure to the actuating fluid from the pressure source through the fluid path 254, maintaining valve 200 in a closed position by forcing diaphragm 220 against valve seat 212.

In certain embodiments, flow passage 226 in boss 224, fluid flow passage 266 in plunger 260, or plunger cavity 268 in plunger 260, may be sized so as to reduce stress on diaphragm 220, boss 224, or threaded joint 225 coupling boss 224 and plunger stem 262, when opening or closing valve 200. As discussed above, positive pressure may be applied to the plunger 260 from a pressure source through the fluid path 254, causing plunger stem 262 to exert force on diaphragm boss 224. Additionally, fluid flow passage 226 allows positive pressure from the pressure source to be applied directly to the back side of the diaphragm 220. Since diaphragm 220 is coupled to plunger stem 262 by threaded joint 225 it is, however, highly desirable that the threaded joint 225 not be (overly or repeatedly) stressed.

It is thus desirable that when the valve 200 is actuated the center of the diaphragm 220 (e.g., where it joins boss 224) moves (e.g., toward valve seat 212 to close the valve) before other portions of the diaphragm 220. If the fluid passage 266 or plunger cavity 268 in plunger 260 are too large, however, then the other portions of diaphragm 220 will move before the center portion of the diaphragm 220, stressing the threaded joint 225. Repeated stressing of the threaded joint 225 may cause the joint 225 to separate or break. Accordingly, the fluid flow passage 266 or plunger cavity 268 may be sized (e.g., with respect to the diameter of plunger 260, stem 262, fluid passage 226, size of boss 224, etc.) to ensure that force is first applied to boss 224, and thus center of diaphragm 220, before it is applied to any other portion of diaphragm 220 (e.g., through fluid flow passage 226). Furthermore, the ratio of the size of fluid flow fluid passage 266 or plunger cavity 268 with respect to the diameter of plunger 260 may be selected to insure that threaded joint 225 is not under tension (and may be substantially under compression).

It should be understood that while embodiments depicted herein have been described with respect to circular or annular diaphragms, valve seats, plungers, cavities, regions or features and the like, embodiments as disclosed herein that allow fluid communication between a region of a valve cavity behind a diaphragm and a source of actuating fluid may be equally effectively utilized with valves that have components or features of other shapes, including components or features that are oblong or rectangular. Such oblong or rectangular features may include diaphragms or bosses, diaphragm spacers or central regions of diaphragm spacers, valve seats, plungers or plunger stems, (assembly, pneumatic or valve) cavities, among other possible oblong or rectangular features or components.

Figure 3A:
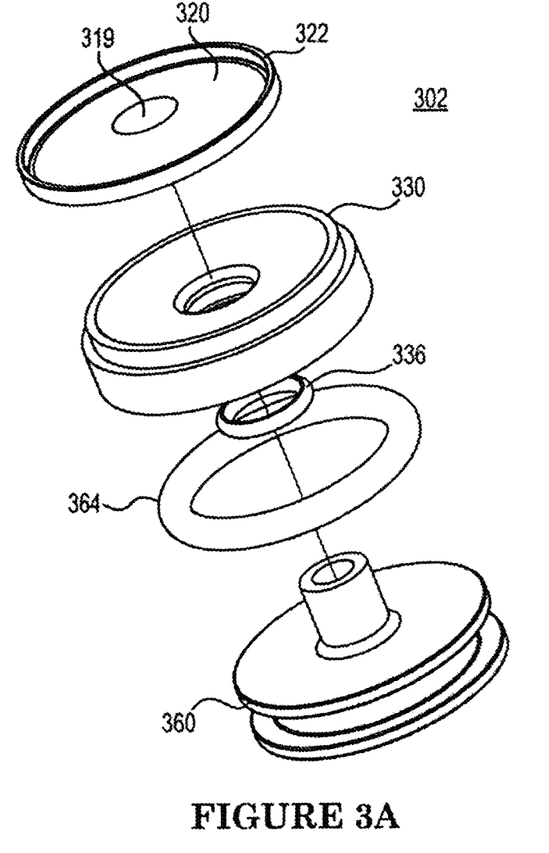
FIGS. 3A-3B are diagrammatic representations of one embodiment of a valve assembly.
Figure 3B:
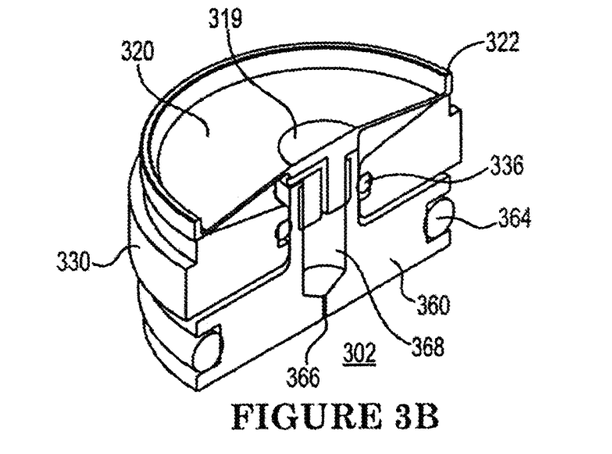

FIGS. 3A-6 depict an embodiment of a valve assembly and its components. Referring first to FIGS. 3A-3B, FIG. 3A is an exploded view of one embodiment of valve assembly 302, including diaphragm assembly 319 having diaphragm 320, diaphragm lip 322, diaphragm spacer 330, O-ring 336, O-ring 364 and plunger 360. In one embodiment diaphragm assembly 319 may be PTFE or modified PTFE such as that sold by Daikin under the trademark Polyflon™, diaphragm spacer 330 and plunger 360 may be an polyoxymethylene (acetal) copolymer and O-rings 336 and 364 may be a fluoroelastomer or synthetic rubber such as that sold by DuPont under the trademark Viton®. It will be noted that these materials are given by way of example and that other, or different materials may be utilized based on the type, application or design of the valve assembly, or components or features thereof. These other materials may include, for example, polymers, including plastics, nylons, ethylene vinyl alcohol (EVOH), polyolefins, or other natural or synthetic polymers, polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (HDPE), high-density polyethylene (HDPE), polypropylene (PP), and/or fluoropolymers, such as but not limited to, polychlorotrifluoroethylene (PCTFE), polytetrafluoroethylene (PTFE), fluorinated ethylene propylene (FEP), perfluoroalkoxy (PFA), or ethylene tetrafluoroethylene (ETFE) including those sold by DuPont under the trademark Tefzel®.

Figure 4A:
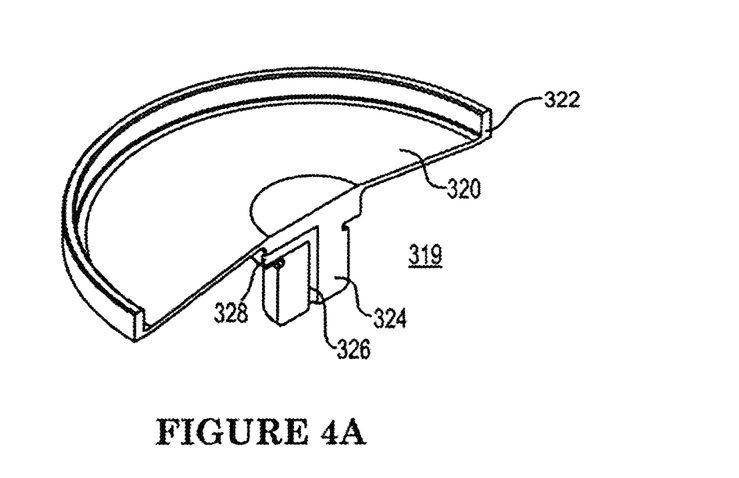
FIGS. 4A-4C are diagrammatic representations of one embodiment of a valve diaphragm and boss.
Figure 4B:
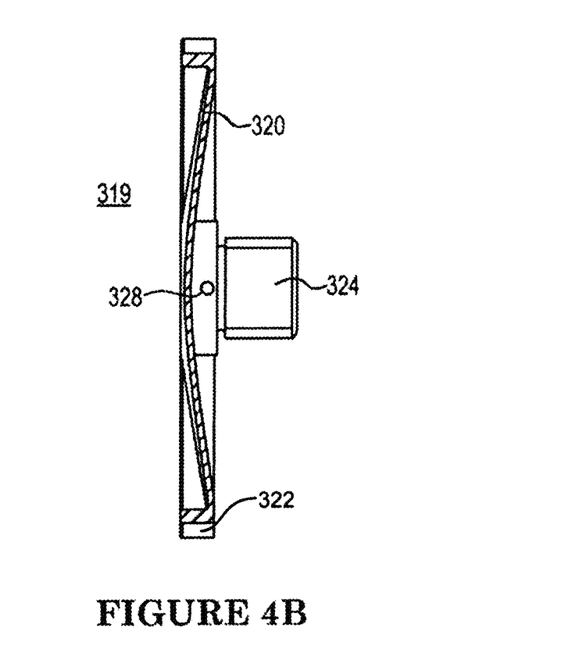
Figure 4C:
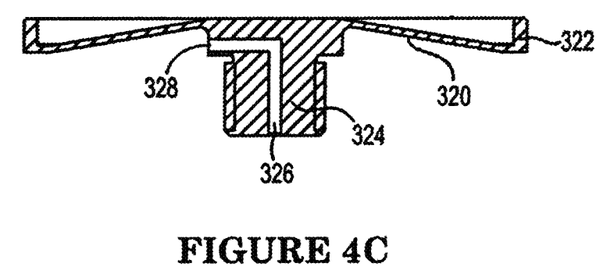
Figure 5A:
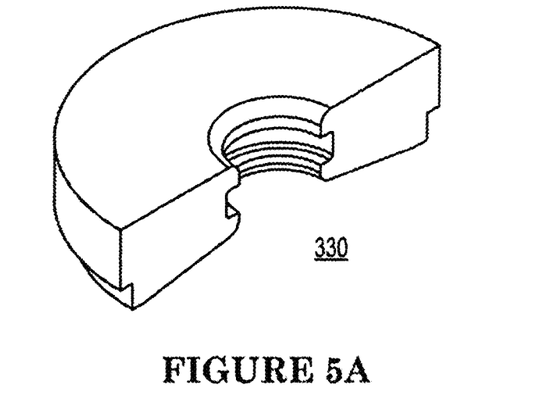
FIGS. 5A-5B are diagrammatic representations of one embodiment of a diaphragm spacer.
Figure 5B:
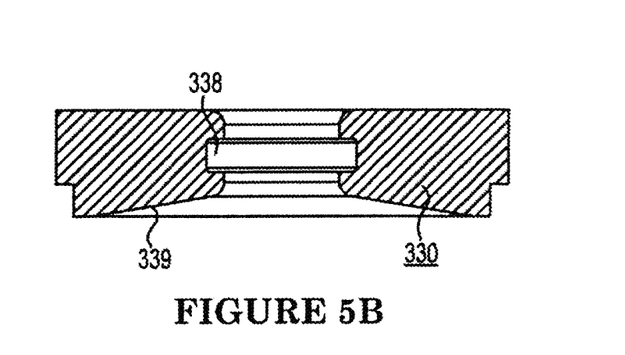
Figure 6:
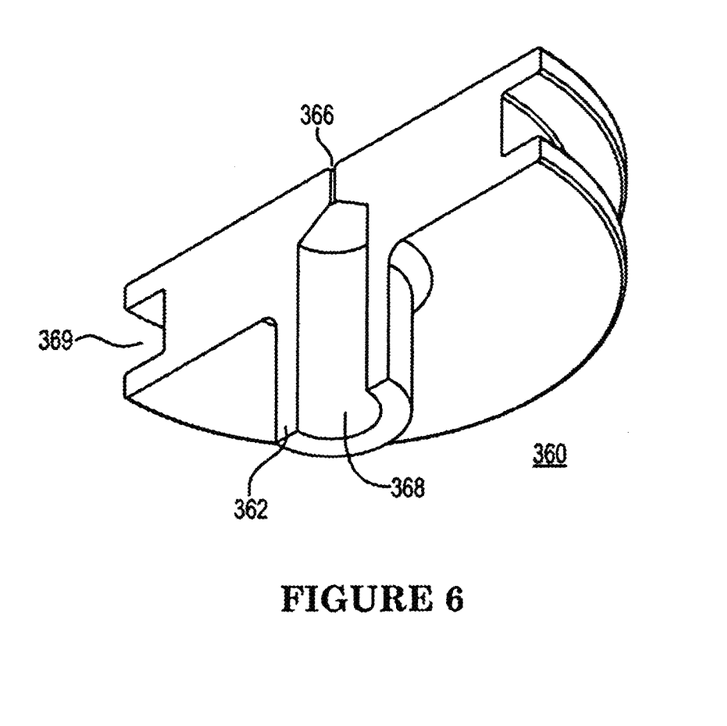
FIG. 6 is a diagrammatic representations of one embodiment of a plunger.

Moving now to FIGS. 4A-4C, different views and details of one embodiment of diaphragm assembly 319, including diaphragm 320, diaphragm lip 322, boss 324, flow passage 326, and flow passage 328 outlet are illustrated, including representative dimensions thereof. FIGS. 5A-5B illustrate different views and details of one embodiment of valve spacer 330 including o-ring annular channel 338 and face 339 of diaphragm spacer 330 which together with valve seat form valve cavity. FIG. 6 illustrates representative dimensions of a view and details of one embodiment of plunger 360, including plunger stem 362, plunger cavity 368, plunger fluid flow passage 366 and annular channel 369 in plunger 360 for a sealing o-ring. It will be noted that to the extent dimensions are provided in these figures, they are provided by way of example for particular embodiments or implementations and are not provided by way of limitation.

Figure 7:
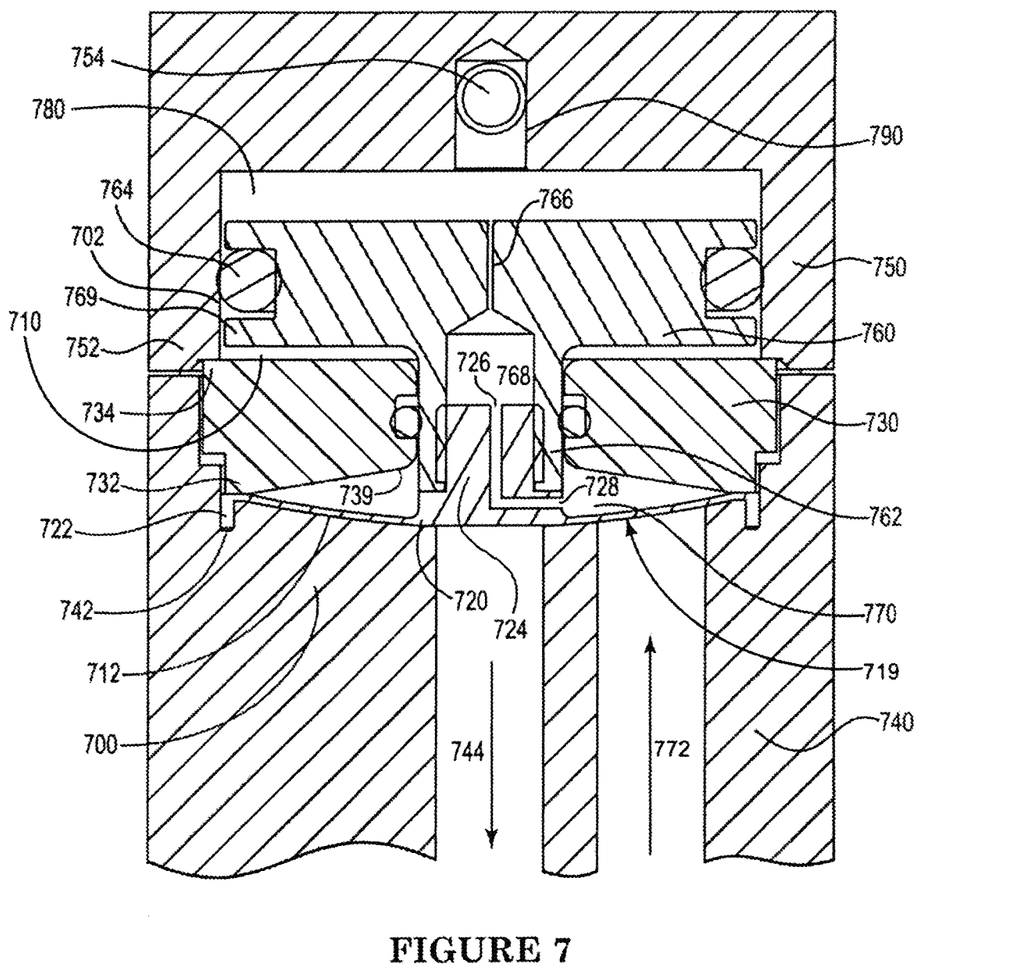
FIG. 7 is a diagrammatic representation of a cross-sectional view of an embodiment of a diaphragm valve.

FIG. 7 illustrates a valve 700 comprising a plunger 760 in a valve assembly cavity 710, the plunger includes a plunger cavity 768 formed in the plunger stem 762, a plunger fluid flow passage 766 through the plunger. The plunger fluid flow passage 766 fluidly connects the actuation fluid cavity 780 in the valve plate 750 and the plunger cavity 768. The valve 700 has a diaphragm assembly 719 in the valve assembly cavity 710, and the diaphragm assembly 719 has a diaphragm 720 and a boss 724. In some embodiments of the diaphragm assembly the diaphragm is coupled to the boss. In the valve, the diaphragm assembly 719 can be secured between a diaphragm spacer 730 and a fluid block 740 in the valve assembly cavity 710. The valve assembly 702 719 fluidly separates the valve cavity 770 in the valve assembly 702 710 into a process fluid side and an actuation fluid side (volume between the backside of diaphragm 720 and diaphragm spacer 730 surface 739). Specifically, valve assembly 702 may be disposed in assembly cavity 710 and valve plate 750 coupled to fluid block 740 using fasteners such as screws or the like (not shown). The coupling force (e.g., torque on the screws) may cause shoulder 752 of valve plate 750 to exert force on corresponding shoulder 734 of diaphragm spacer 730. Shoulder 732 of diaphragm spacer in turn, exerts force on lip 722 of diaphragm 720 captured in channel 742 of fluid block 740 to retain diaphragm 720 in channel 742. The boss 724 is coupled to the plunger stem 762 through a passage of the diaphragm spacer 730. The boss 724 comprises a boss fluid flow passage 726 formed therethrough that fluidly interconnects the activation fluid cavity 780, the plunger cavity 768, and the actuation fluid side of the valve cavity 770. The actuation fluid volume portion of the valve cavity 770 and process fluid volume portion of the valve cavity 770 are separated by the diaphragm 720.

In some embodiments the valve 700, the plunger fluid flow passage 766 and boss fluid flow passage 726 have a length and cross section such that plunger 760 is translated toward or away from the fluid actuation cavity 780 in the valve plate 750 by a change in pressure in the fluid activation cavity 780 before substantial pressure is applied to or reduced in the volume of the fluid actuation side of the valve cavity 770 between the back of the diaphragm 720 and diaphragm spacer 730. Fitting 790 may serve to couple the pressure source to the fluid flow passage 754. An O-ring 764 may be disposed in an annular channel 769 in plunger 760 and seal against the inner walls of assembly cavity 710 in valve plate 750 to seal pneumatic cavity 780 from other portions of the assembly cavity 710.

In some embodiments of the valve 700 the plunger fluid flow passage 766 open to plunger cavity 768 and an opening 728 of the boss fluid flow passage 726 to a back side of diaphragm 720 and activation fluid side of valve cavity 770 allow fluid communication between plunger cavity 768 and valve cavity 770 when opening 728 of fluid flow passage 726 in boss 724 clears central passage of diaphragm spacer 730.

One embodiment includes a method of operating a valve (200, 700) that comprises the acts or steps of applying a fluid force to the backside of a plunger (260, 760) and to the backside of a diaphragm in a diaphragm assembly, where the plunger and the backside of the diaphragm are fluidly coupled. Moving the plunger in a valve assembly cavity (210, 710), the plunger comprises a plunger cavity (268, 768) formed in a plunger stem (262 762), and a plunger fluid flow passage (266, 766) in the plunger. The plunger fluid flow passage (266,766) fluidly connects an actuation fluid cavity (280, 780) in a valve plate (250, 750) and the plunger cavity (268, 768). The method further includes moving the diaphragm and the diaphragm assembly (219, 719) in said valve assembly cavity (210, 710) by application of the fluid force to open or close the valve against the valve seat (712), wherein the diaphragm assembly (219, 719) comprises a diaphragm (220, 720) and a boss (224 724), said diaphragm assembly (219, 719) secured between a diaphragm spacer (230, 730) and a fluid block (240, 740) in the valve assembly cavity (210, 710). The diaphragm assembly (219, 719) fluidly separating said a valve cavity (270, 770) in the valve assembly (210, 710) into a process fluid side and an actuation fluid side. The boss (224, 724) is coupled to the plunger stem (262, 762) through a passage of the diaphragm spacer (230, 730). The boss (224, 724) comprises a boss fluid flow passage (226, 726) formed therethrough that fluidly interconnects the activation fluid cavity (280, 780), the plunger cavity (268, 768), and the actuation fluid side of said valve cavity (270, 770). The method can include operating a valve where the force is applied by vacuum or reduced pressure of an actuating fluid through a plunger fluid flow passage 266 and plunger cavity 268 in plunger 260 and fluid flow passage 226 through boss 224 of diaphragm assembly 219, said plunger and diaphragm assembly cooperate to allow fluid communication between the plunger fluid flow passage and the annular space of the actuation fluid side of valve cavity 270 behind diaphragm 220. The method of can further comprise introducing fluid into a process fluid side of the valve cavity from an inlet fluid flow path 772. The method can include controlling the flow of any process fluid or liquid. In some embodiments the process liquid flow that can be controlled can have a viscosity of between 100 and 20,000 centipoise through the fluid inlet 772 and fluid outlet 744 of the valve.

As will be realized after reading the above disclosure, embodiments of the valves as disclosed herein can be advantageously utilized in a wide variety of fluid systems, including fluid systems utilized in the pumping or dispense of chemicals in semiconductor manufacturing. For example, embodiments may be utilized with a pumping system, including for example, multi-stage pumping systems where multiple valve assembly cavities may be incorporated into a single fluid block such as 240 and 250 with flow paths machined therein. The use of such valves in these types of fluid systems may have numerous advantages as detailed hereinabove as, according to some embodiments, around 40% more fluid or air may be evacuated from a closed valve than a comparable valve without such fluid passages formed in the diaphragm.

Data showing the efficacy of embodiments as disclosed herein relative to previous diaphragm valves is included in the example below.

Assembled two new valve assemblies similar to those in FIG. 2 and two older valve assemblies similar to those in FIG. 1 in a four valve test block. Apply 60 pounds per square inch gas pressure to close valve and reduced pressure ("vacuum") to open valves. Tee the inlet and outlet together and apply 45 (psi) pneumatic. Actuate the valves open and close to break valves in about 500 times. The test is to look for the volume difference in fluid volume displacement between the current and new valve. For the test, remove the tee from the fluid tubes; the fluid tubes are about 12 inches long standing straight up, tube inside diameter is 0.3 inches. Fill with isopropyl alcohol and cycle valves to get all air out. Use mineral oil viscosity 1148 centipoise at 20 degrees centigrade. Open all 4 valves. Mark the fluid column on all 4 tubes. Close all 4 valves and mark the fluid column. Measure the delta volume.

TABLE 1

| | | Outlet delta (inches) | Outlet delta (centimeters) | Timing Seconds | Outlet Delta volume (cc) |
|---|---|---|---|---|---|
| Test Valve New #1 | Test 1 | 3.586 | 9.108 | 4 | 0.64 |
| | Test 2 | 3.123 | 7.932 | 4 | 0.56 |
| | Test 3 | 3.202 | 8.133 | 4 | 0.57 |
| Test Valve New #2 | Test 1 | 3.623 | 9.202 | 4 | 0.65 |
| | Test 2 | 3.105 | 7.886 | 4 | 0.56 |
| | Test 3 | 3.231 | 8.207 | 4 | 0.58 |
| Test Valve Old #1 | Test 1 | 2.107 | 5.352 | 3 | 0.38 |
| | Test 2 | 1.983 | 5.037 | 3 | 0.36 |
| | Test 3 | 2.165 | 4.991 | 3 | 0.39 |
| Test Valve Old #2 | Test 1 | 2.109 | 5.357 | 3 | 0.38 |
| | Test 2 | 1.981 | 5.032 | 3 | 0.36 |
| | Test 3 | 2.162 | 5.491 | 3 | 0.39 |

The results in Table 1 show the new valve has increased outlet volume (average was 0.59 cubic centimeters) compared to the old valve outlet volume of 0.37 cubic centimeters. The improvement in output volume was 37% for the new valves compared to the old valves. The time to close the new valve was slightly longer because an increase volume of viscous fluid was being displaced (4 seconds vs 3 seconds). The test results for the new valves that have a plunger fluid flow passage that fluidly connects an actuation fluid cavity with a boss fluid flow passage (226, 726) and the actuation fluid side of the valve cavity show higher volume compared to the old valve which lacks the plunger flow passage and boss fluid flow passage. The increased outlet volume indicates more complete removal of fluid from trapped areas between the diaphragm and valve seat by applying pressure on the backside of the diaphragm in the actuation fluid side of the valve cavity. By applying actuating fluid to the back side of the diaphragm in the valve, the viscous mineral oil is forced out from between the diaphragm and valve seat resulting in a higher outlet volume. It will be understood that the Example refers to specific embodiments only and that any restrictive language, configurations, settings, values, etc. appearing therein will be taken to apply only to that embodiment and not to embodiments as disclosed herein generally.

As used herein, the terms comprises, comprising, includes, including, has, having or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, or refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only.

Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: for example, for instance, e.g., in one embodiment, and the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described.

What is claimed is:

1. A method of operating a valve comprising:
    applying a fluid force to a backside of a plunger and to a backside of a diaphragm in a diaphragm assembly, said plunger and the backside of the diaphragm are fluidly coupled;
    moving said plunger in a valve assembly cavity, said plunger comprises a plunger cavity formed in a plunger stem, and a plunger fluid flow passage in said plunger, said plunger fluid flow passage fluidly connects an actuation fluid cavity in a valve plate and the plunger cavity;
    moving the diaphragm and the diaphragm assembly in said valve assembly cavity by application of said fluid force to open or close the valve against a valve seat, wherein said diaphragm assembly comprises the diaphragm and a boss, said diaphragm assembly secured between a diaphragm spacer and a fluid block in said valve assembly cavity, said diaphragm assembly fluidly separating said valve cavity in said valve assembly into a process fluid side and an actuation fluid side, said boss coupled to said plunger stem through a passage of the diaphragm spacer, said boss comprises a boss fluid flow passage formed therethrough and that fluidly interconnects an activation fluid cavity, the plunger cavity, and the actuation fluid side of said valve cavity.

2. The method of claim 1 where the force is applied by vacuum or reduced pressure of an actuating fluid through a plunger fluid flow passage and the plunger cavity in the plunger and the fluid flow passage through the boss of the diaphragm assembly, said plunger and the diaphragm assembly cooperate to allow fluid communication between the plunger fluid flow passage and an annular space of the actuation fluid side of the valve cavity behind the diaphragm.

3. The method of claim 1 further comprising introducing fluid into a process fluid side of said valve cavity from an inlet fluid flow path.

4. The method of claim 1 wherein the process fluid has a viscosity of between 100 and 20,000 centipoise.

5. A valve comprising:
a fluid block that comprises a process fluid inlet and a process fluid outlet;
a valve plate that comprises an actuation fluid cavity; and
a valve assembly disposed in an assembly cavity formed by the fluid block and the valve plate;
a valve cavity in said assembly cavity, said valve cavity formed between a diaphragm spacer and a valve seat in said assembly cavity;
a plunger in said assembly cavity, said plunger comprises a plunger cavity formed in a plunger stem, and a plunger fluid flow passage in said plunger, said plunger fluid flow passage fluidly connecting the actuation fluid cavity and the plunger cavity;
a diaphragm assembly in said assembly cavity, said diaphragm assembly comprises a diaphragm and a boss, said diaphragm assembly secured by said diaphragm spacer and said fluid block in said assembly cavity and fluidly separating said valve cavity into a process fluid side and an actuation fluid side, said boss coupled to said plunger stem through a central passage of the diaphragm spacer, said boss comprises a boss fluid flow passage formed therethrough that provides fluid communication between the activation fluid cavity, the plunger cavity, and an actuation fluid side of said valve cavity.

6. The valve of claim 5 wherein the plunger fluid flow passage and said boss fluid flow passage have a length and a cross section such that the plunger is translated toward or away from the fluid actuation cavity in the valve plate by a change in pressure in the fluid activation cavity before substantial pressure is applied to or pressure is reduced in a volume of the fluid actuation side of the valve cavity between the diaphragm and the diaphragm spacer.

7. The valve of claim 5 wherein the plunger fluid flow passage is open to the plunger cavity and an opening of said boss fluid flow passage that opens to a back side of diaphragm and the activation fluid side of the valve cavity allows fluid communication between the plunger cavity and the valve cavity when the opening of the fluid flow passage in the boss clears the central passage of the diaphragm spacer.

8. The valve of claim 6 wherein the plunger fluid flow passage is open to plunger cavity and an opening of said boss fluid flow passage that opens to a back side of the diaphragm and an activation fluid side of the valve cavity allows fluid communication between the plunger cavity and the valve cavity when the opening of the fluid flow passage in the boss clears the central passage of the diaphragm spacer.

9. A valve comprising:
a valve assembly disposed in an assembly cavity formed between a valve plate and a fluid block, said the fluid block includes an inlet fluid flow passage and an outlet fluid flow passage open to the assembly cavity through a valve seat of the fluid block;
a valve cavity formed in a portion of the assembly cavity between a diaphragm spacer and the valve seat in the fluid block; said valve assembly further comprises a diaphragm assembly, said diaphragm assembly has a diaphragm coupled to a boss, said diaphragm spacer disposed between an upper surface of the diaphragm and a plunger disposed in the assembly cavity, said diaphragm assembly captured and retained in the valve assembly in cooperation with said diaphragm spacer and the fluid block;
a boss of the diaphragm assembly coupled to a plunger through a central passage of said diaphragm spacer, a stem of the plunger extending through the central passage of said diaphragm spacer and coupled to the boss of the diaphragm assembly;
a pneumatic cavity disposed in a portion of assembly cavity between the back side of plunger and the valve plate, said pneumatic cavity communicating with a pressure source through the fluid flow passage in the valve plate;
said plunger comprises a plunger fluid flow passage that provides fluid communication between a plunger cavity formed in the plunger stem and the pneumatic cavity, the boss of said diaphragm assembly comprises a boss fluid flow passage formed therethrough, that includes an opening to the plunger cavity and is fluidly connected to an opening in the boss that is in fluid communication with the back side of the diaphragm whereby actuating fluid communicates between the plunger cavity and an actuation fluid side of the valve cavity.

10. The valve of claim 9 wherein the plunger fluid flow passage and the boss fluid flow passage have a length and a cross section such that the plunger is translated toward or away from the fluid actuation cavity in the valve plate by a change in pressure in the fluid activation cavity before substantial pressure is applied to or pressure is reduced in the fluid actuation side of the valve cavity between a back of the diaphragm and the diaphragm spacer.

11. The valve of claim 9 wherein the plunger fluid flow passage is open to the plunger cavity and an opening of said boss fluid flow passage that opens to a back side of the diaphragm and an activation fluid side of the valve cavity allows fluid communication between the plunger cavity and the valve cavity when the opening of the fluid flow passage in the boss clears the central passage of the diaphragm spacer.

12. The valve of claim 10 wherein the plunger fluid flow passage is open to the plunger cavity and an opening of said boss fluid flow passage that opens to a back side of the diaphragm and the activation fluid side of valve cavity allows fluid communication between the plunger cavity and the valve cavity when the opening of the fluid flow passage in the boss clears the central passage of the diaphragm spacer.

13. The valve of claim 10 wherein a shoulder of the valve plate exerts a force on a corresponding shoulder of the diaphragm spacer, the shoulder of the diaphragm spacer exerts force on a lip of the diaphragm captured in the channel of the fluid block to retain the lip of the diaphragm in the channel.

* * * * *